US012780113B2

(12) United States Patent
Isings et al.

(10) Patent No.: US 12,780,113 B2
(45) Date of Patent: Nov. 3, 2026

(54) VEHICLE QUARTER GLASS STRUCTURE

(71) Applicant: Honda Motor Co., Ltd., Tokyo (JP)

(72) Inventors: Connor Isings, Columbus, OH (US); Timothy J. Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 18/422,278

(22) Filed: Jan. 25, 2024

(65) Prior Publication Data

US 2025/0242762 A1 Jul. 31, 2025

(51) Int. Cl.

*B60R 11/04* (2006.01)
*B60J 1/00* (2006.01)
*B60J 1/10* (2006.01)
*B60R 11/00* (2006.01)
*B62D 65/02* (2006.01)

(52) U.S. Cl.

CPC ............... *B60R 11/04* (2013.01); *B60J 1/007* (2013.01); *B60J 1/10* (2013.01); *B60R 2011/0045* (2013.01); *B62D 65/02* (2013.01)

(58) Field of Classification Search

CPC .. B60R 11/04; B60R 2011/0045; B60J 1/007; B62D 65/02
USPC ..................................................... 296/190.08
See application file for complete search history.

(56) References Cited

U.S. PATENT DOCUMENTS 7,266,219 B2 9/2007 Okamoto et al.
9,857,797 B2 * 1/2018 Hara .................... G01S 17/931
10,107,026 B2 10/2018 Dezorzi et al.
11,057,568 B2 7/2021 Kobylinski et al.
11,148,577 B2 10/2021 Tsutsumi
2020/0398646 A1 12/2020 Mujcinovic et al.
2022/0014650 A1 * 1/2022 Muramatsu ............ H04N 7/181
2022/0132047 A1 4/2022 Nagashima et al.
2023/0001772 A1 1/2023 Nagashima et al.
2024/0375577 A1 * 11/2024 Zeng .......................... B60J 1/08

FOREIGN PATENT DOCUMENTS

DE 102004029418 A1 1/2006
JP 2025104534 A * 7/2025 ............... B60R 1/22
KR 101144732 B1 5/2012
WO 2006093073 A1 9/2006

OTHER PUBLICATIONS

Nakayama, Japanese Patent No. JP-2025104534-A, English translation dated 2026. (Year: 2025).*

* cited by examiner

*Primary Examiner* — Caroline N Butcher
(74) *Attorney, Agent, or Firm* — Mark Duell; American Honda Motor Co., Inc.

(57) ABSTRACT

A quarter glass structure includes an encapsulation with a cavity to receive at least edges of a rear quarter glass of a vehicle. The quarter glass structure further includes a bezel disposed on a first side of the encapsulation and a cover disposed on a second side of the encapsulation such that a space is formed between the cover and the encapsulation. The space is configured to include at least one sensor unit. The encapsulation and the bezel together form a support frame that includes an opening to receive a first portion of the at least one sensor unit.

17 Claims, 4 Drawing Sheets

VEHICLE QUARTER GLASS STRUCTURE

BACKGROUND

Vehicle quarter glass, also known as quarter light, is a side window located in a front door of a vehicle, or on each side of the vehicle just forward of rear facing rear windshield of the vehicle. Furthermore, safety cameras are installed behind a glass associated with a quarter glass structure. However, due to the low light transmissivity of the privacy glass of the safety cameras, if the safety cameras are deployed behind the glass of the quarter glass structure, the glass must be green. Furthermore, deployment of the safety cameras behind the glass of the quarter glass structure requires a garnish that sacrifices aesthetics of the vehicle quarter glass. This necessitates development of a structure for the vehicle quarter glass, which limits the changing of the glass of the quarter glass structure to green glass. The structure of the vehicle quarter glass also restricts installing the garnish to secure the safety cameras.

Limitations and disadvantages of conventional and traditional approaches will become apparent to one of skill in the art, through comparison of described systems with few aspects of the present disclosure, as set forth in the remainder of the present application and with reference to the drawings.

SUMMARY

According to an embodiment of the disclosure, a quarter glass structure may be provided. The quarter glass structure may include an encapsulation that may include a cavity configured to receive at least edges of a rear quarter glass of a vehicle. The quarter glass structure may further include a bezel that may be disposed on a first side of the encapsulation. The quarter glass structure may further include a cover that may be disposed on a second side of the encapsulation such that a space may be formed between the cover and the encapsulation. The space may be configured to include at least one sensor unit. The encapsulation and the bezel together may form a support frame that may include an opening configured to receive a first portion of the at least one sensor unit.

According to another embodiment of the disclosure, a vehicle body having a quarter glass structure may be provided. The quarter glass structure may include an encapsulation that may include a cavity configured to receive at least edges of a rear quarter glass of a vehicle. The quarter glass structure may further include a bezel that may be disposed on a first side of the encapsulation. The quarter glass structure may further include a cover that may be disposed on a second side of the encapsulation such that a space may be formed between the cover and the encapsulation. The space may be configured to include at least one sensor unit. The encapsulation and the bezel together may form a support frame that may include an opening configured to receive a first portion of the at least one sensor unit.

According to another embodiment of the disclosure, a method of installation of at least one sensor unit in a vehicle may be provided. The method may include removing a cover of a quarter glass structure to expose a space between the cover and an encapsulation of the quarter glass structure. A bezel may be disposed on a first side of the encapsulation and the cover may be disposed on a second side of the encapsulation. The encapsulation may include a cavity configured to receive at least edges of a rear quarter glass of the vehicle. The method may further include disposing the at least one sensor unit in the space such that a first portion of the at least one sensor unit may be disposed in an opening of a support frame formed by the encapsulation and the bezel. The method may further include disposing the cover over the sensor unit to seal the at least one sensor unit in the space.

Figure 1:
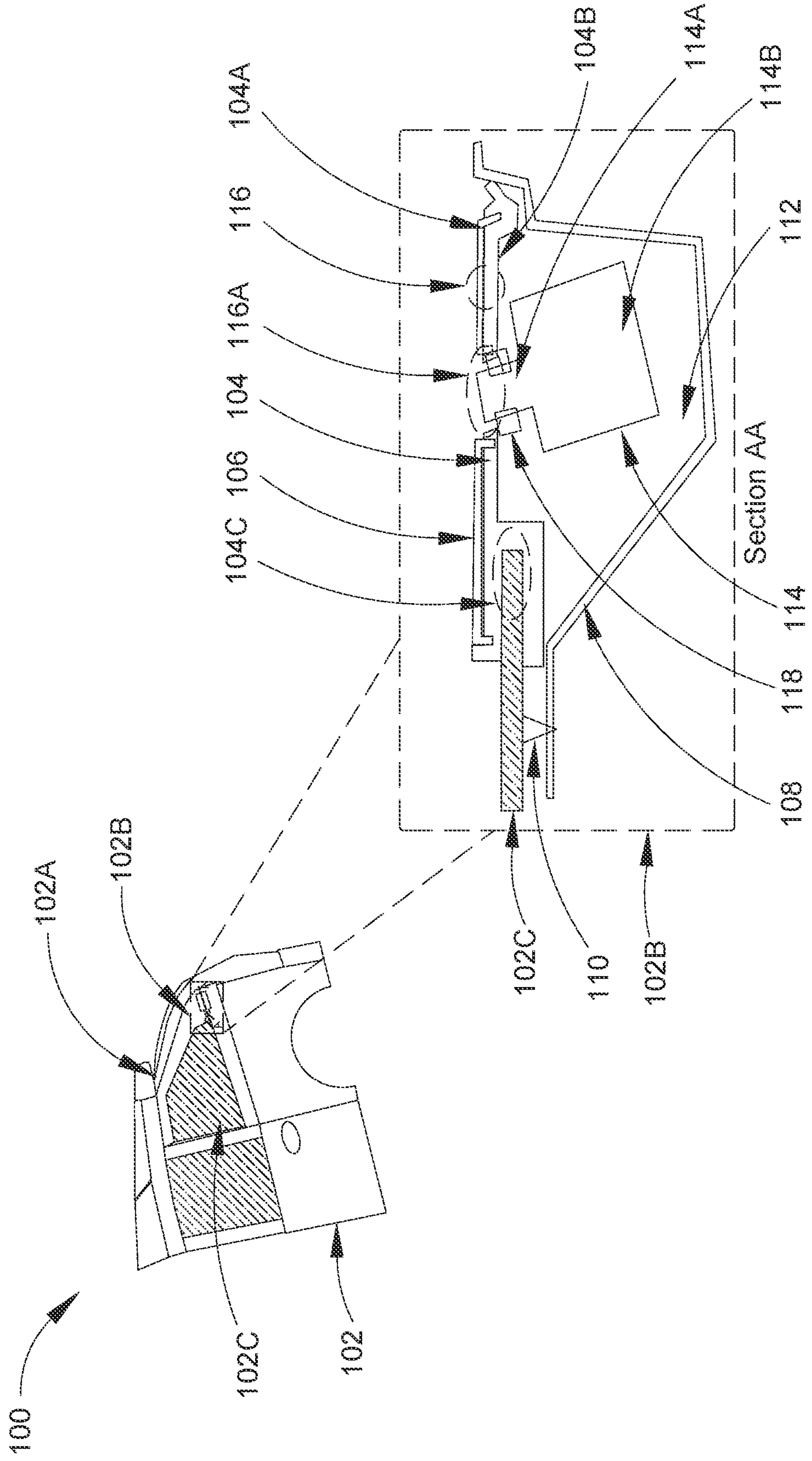
FIG. 1 is a diagram that illustrates a zoomed view of an exemplary body panel portion for a quarter glass structure, in accordance with an embodiment of the disclosure.

The foregoing summary, as well as the following detailed description of the present disclosure, is better understood when read in conjunction with the appended drawings. To illustrate the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

Various embodiments of the present disclosure may be found in a quarter glass structure. The disclosed quarter glass structure may include an encapsulation that may include a cavity to receive at least edges of a rear quarter glass of a vehicle. A bezel may be disposed on a first side of the encapsulation and a cover may be disposed on a second side of the encapsulation a main frame, such that a space may be formed between the cover and the encapsulation. The space may be configured to include at least one sensor unit. Further, the encapsulation and the bezel together form a support frame which may include an opening configured to receive a first portion of the at least one sensor unit.

Traditionally, installation of the rear quarter glass in a vehicle while having safety cameras behind the glass can cause a number of issues. For example, If the camera is packaged behind the glass, then the glass must be a green glass due to the low light transmissivity of a privacy glass. Alternatively, the deployment of the safety camera behind the quarter glass may require a garnish to secure the safety camera, which may sacrifice aesthetics of the quarter glass.

To overcome some of the abovementioned issues, the proposed quarter glass structure may include the least one sensor unit placed in the space formed between the cover and the encapsulation. The quarter glass structure may further include the opening provided on the support frame formed by the encapsulation and the bezel. The opening may receive the first portion of the at least one sensor unit. The installation of the sensor unit with the proposed quarter glass structure without requiring changing the glass or adding a garnish, makes the vehicle quarter glass aesthetic from a design perspective or a customer's point of view. Additionally, the opening may act as datum for the sensor unit that may allow the quarter glass structure to achieve compact packaging of the sensor unit.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a diagram that illustrates a zoomed view of an exemplary body panel portion for a quarter glass structure, in accordance with an embodiment of the disclosure. With reference to the FIG. 1, there is shown a diagram that illustrates a body panel portion 100 associated with a vehicle body 102A of a vehicle 102. The body panel portion 100 may include a quarter glass structure 102B and a rear quarter glass 102C. The quarter glass structure 102B may include an encapsulation 104 having a first side 104A, a second side 104B, and a cavity 104C. The quarter glass structure 102B may further include a bezel 106, a cover 108 having a portion 108A, and a space 112 that may be formed between the encapsulation 104 and the cover 108. The quarter glass structure 102B may further include a sensor unit 114 having a first portion 112A and a second portion 112B, and a support frame 116 having an opening 116A. The quarter glass structure 102B may further include a spacer 110 and a lip seal 118.

The vehicle 102 may be a means of transport with one or more see-through panels, at least one of which includes a quarter glass. The vehicle 102 may include a plurality of electronic devices, such as, but not limited to, cameras, speed sensors, pressure sensors, proximity sensors, or other sensors. Such devices may be placed around different locations in the vehicle 102. For example, a camera may be placed near a quarter glass to capture an environment outside the vehicle 102. Examples of the vehicle 102 may include, but are not limited to, a three-wheeler vehicle, a four-wheeler vehicle, a hybrid vehicle, a railed vehicle, an amphibious vehicle (for example, screw-propelled vehicle, or hovercraft), an aircraft (for example, planes, helicopters, or aerostats), or a watercraft (for example, ships, or boats) or an underwater vehicle. Examples of the four-wheeler vehicle may include, but are not limited to, an electric car, an internal combustion engine (ICE)-based car, a fuel-cell based car, a solar powered-car, or a hybrid car.

It should be noted here that the four-wheeler vehicle is merely shown as an example in FIG. 1. The present disclosure may also be applicable to other types of vehicle (for example, a three-wheeled vehicle, an unmanned or manned airborne vehicle, or a seaborne vehicle). The description of other types of the vehicle 102 has been omitted from the disclosure for the sake of brevity.

The vehicle body 102A may be a main support structure of the vehicle 102 which may be configured to bear stresses induced on the vehicle 102. The vehicle body 102A may be a load-bearing framework of the vehicle 102, which structurally supports a plurality of vehicle systems, such as, but not limited to a transmission system, a brake system, a suspension system, or a steering system. For example, the vehicle body 102A for the four-wheeler vehicle may include a plurality of components, such as, but not limited, a cabin, a roof body, suspension springs or bar, wheels, at least one axle, an engine, a motor, a fuel tank, seats, or steering. The present disclosure may be applicable to the vehicle body 102A of other types of vehicles (for example, a three-wheeled vehicle, an unmanned or manned airborne vehicle, or a seaborne vehicle). The description of such types of the vehicle body 102A has been omitted from the disclosure for the sake of brevity.

The vehicle body 102A with a permanent roof body may include a plurality of pillars. Such pillars may be referred to as vertical body parts that separate the greenhouse—the glass surfaces that extend from a belt line to the vehicle's roof. The pillars are critical support structures that connect the vehicle's bottom half to its roof, and vice versa. Roof pillars are denoted by the letters A, B, C, and D from front to back and provide structural strength to the vehicle body 102A. The A-pillars are located at the front of the vehicle 102, on either side of a front facing windshield. The B-pillar is located between a vehicle's front and rear side glass, where it serves as a structural support of its roof. The C-pillar is the rearmost on two- and four-door sedans and hatchbacks. The D-pillar is the rearmost pillar on larger four-door vehicles such as station wagons and full-sized SUVs. The D pillar may be configured to support the roof body at each corner of a rear facing windshield of the vehicle 102. By way of an example, and not limitation, the C pillar may be configured to receive the quarter glass structure 102B which may include a quarter glass. Additionally, or alternatively, a surface between the C pillar and the D pillar may be configured to receive the quarter glass structure 102B.

The quarter glass structure 102B may be a support structure located at a front door of the vehicle 102 or on either side of the vehicle 102 just forward of the rear facing windshield of the vehicle 102. The quarter glass structure 102B is shown to have a substantially trapezoidal shape in FIG. 1, is merely an example. Alternatively, the quarter glass structure 102B may be formed to have another shape (for example, a substantially triangular shape, a substantially square shape, a substantially circular shape, a substantially semi-circular shape, and the like), without a departure from the scope of the present disclosure. The quarter glass structure 102B may be attached to the vehicle body 102A using at least one of a seal, glue, or hinge. The quarter glass structure 102B may be configured to receive the quarter glass. The quarter glass structure 102B may be disposed on the C pillar of the vehicle body 102A, may be referred to as the rear quarter glass structure. Additionally, the quarter glass structure 102B disposed on the surface between the C pillar and the D pillar may be referred as the rear quarter glass structure. The quarter glass associated with the rear quarter glass structure may be referred to as the rear quarter glass 102C.

The rear quarter glass 102C, also known as a quarter light or valence window, is a vehicle's side-facing window that is much smaller than standard passenger windows. The rear quarter glass 102C may function as an extension of the passenger window, either above the rear wheel or next to the side-view mirrors. The rear quarter glass 102C may be made of a suitable glass material, for example, a tempered glass which is stronger than ordinary glass and shatters into harmless small pieces when struck. The rear quarter glass 102C may improve the driver's visibility of the surroundings and may contribute to an overall strength of a vehicle's structure. Additionally, the rear quarter glass 102C may help to reduce blind spots for the driver and may aid in ventilation by allowing air to flow through the vehicle 102, as the rear quarter glass 102C may roll down like regular windows or may be hinged to quarter windows of the vehicle 102.

In some embodiments, the rear quarter glass 102C may be the last piece of glass on the side of the vehicle 102. For example, the rear quarter glass 102C may be disposed on one of the C pillar or between the C pillar and the D pillar of the vehicle 102. In FIG. 1, the rear quarter glass 102C is shown to have a substantially trapezoidal shape. However, the trapezoidal shape of the rear quarter glass 102C is merely an example and such an example should not be construed as limiting the disclosure. In some other embodiments, the rear quarter glass 102C may be formed to have a different shape (for example, a substantially triangular shape, a substantially square shape, a substantially circular shape, a substantially semi-circular shape, and the like), without a departure from the scope of the present disclosure.

The encapsulation 104 may be a polymeric material that may be injected around at least edges of the rear quarter glass 102C to provide structural support to the rear quarter glass 102C. The process of creating a frame around the edges of the rear quarter glass 102C by injecting the polymetric material using a framing mold, may be termed as a glass encapsulation. The encapsulation 104 may use polymeric material, such as, but not limited to, a thermoplastic elastomer (TPE), a Polyvinyl Chloride (PVC), or a Polyurethane (PU). By way of example, and not limitation, the encapsulation 104 may be injected on glasses, such as, but not limited to tempered glass, laminated glass, insulated glass, or coated glass. By way of another example, and not limitation, the encapsulation 104 may be used for fitting doors and windows of the vehicle 102.

The encapsulation 104 may include the first side 104A and the second side 104B. By way of an example, and not limitation, the first side 104A of the encapsulation 104 may be on exterior side of the vehicle 102 and the second side 104B of the encapsulation 104 may be on interior side of the vehicle 102. The encapsulation 104 may further include the cavity 104C that may be configured to receive at least edges of the rear quarter glass 102C. By way of example, and not limitation, the cavity 104C may sandwich the rear quarter glass 102C and may ensure that the encapsulation 104 is provided on both sides of the rear quarter glass 102C.

The bezel 106 may be a support frame disposed around edges of the encapsulation 104 to secure the rear quarter glass 102C with the quarter glass structure 102B. The bezel 106 may provide structural support to the rear quarter glass 102C. The bezel 106 may be configured to bear stresses induced on the quarter glass structure 102B and may firmly secure the rear quarter glass 102C with the quarter glass structure 102B to protect the rear quarter glass 102C from any physical damage. The bezel 106 may be made of materials, such as, but not limited to, stainless steel, aluminum, or brass. The bezel may be disposed on one of the first side 104A or the second side 104B of the encapsulation 104. As an example, the bezel 106 is shown to be disposed on the first side 104A of the encapsulation 104 in FIG. 1.

The cover 108 may be a removable structure forming a housing over the sensor unit 114. The cover 108 may be disposed on the second side 104B of the encapsulation 104 such that the space 112 may be formed between the cover 108 and the encapsulation 104. By way of example, and not limitation, the cover 108 may be disposed on the second side 104B of the encapsulation 104 using at least one of a screw, a nut and bolt, a rivet, glue, or hinge. Removing the cover 108 may provide on access point for an operator to access the sensor unit 114 for repair or replacement. The cover 108 may be designed to secure the sensor unit 114 to prevent the sensor unit 114 from physical damage. By way of example, and not limitation, the cover 108 may be made from on one of SPO, stainless steel, glass-reinforcement plastic, or other composite materials.

The cover 108 may be also disposed on one of entire periphery of the second side 104B of the encapsulation 104, or a corner portion of the second side 104B of the encapsulation 104. For example, the cover 108 may be disposed on the entire periphery of the second side 104B of the encapsulation 104 in case the quarter glass structure 102B is attached between the C pillar and the D pillar. Alternatively, the cover 108 may be disposed on the corner portion of the second side 104B of the encapsulation 104 in case the quarter glass structure 102B is attached on the C pillar. Moreover, the cover 108 may extend over the portion 108A of the rear quarter glass 102C. The portion 108A may be separated from the rear quarter glass 102C using the spacer 110.

The spacer 110 may be a piece of material used to maintain a gap between the portion 108A of the rear quarter glass 102C and the cover 108. The spacer 110 is shown to have substantially triangular shape in FIG. 1 as an example. Alternatively, the spacer 110 may be formed to have another shape (for example, a substantially trapezoidal shape, a substantially square shape, a substantially circular shape, a substantially semi-circular shape, and the like), without a departure from the scope of the present disclosure. By way of example, and not limitation, the spacer 110 may maintain the gap between the portion 108A and the cover 108 to provide space for the rear quarter glass 102C to expand due to thermal expansion. The spacer 110 may also prevent a direct contact between the portion 108A and the cover 108 to protect the portion 108A of the rear quarter glass 102C from potential wear and tear. The spacer 110 may be made from materials, such as, but not limited to, steel, stainless steel, rubber, nylon, or aluminum.

The space 112 formed between the cover 108 and the encapsulation 104 may be configured to include the at least one sensor unit 114. The sensor unit 114 may include suitable logic, circuitry, and interfaces that may be configured to receive or capture information, such as an image or a plurality of images from at least outward of the vehicle 102. Examples of the sensor unit 114 may further include, but are not limited to, a camera unit, a proximity sensor, an infrared sensor, an ultrasonic sensor, a touch sensor, a light sensor, and an optical sensor. The sensor unit 114 may further include a processor that may be configured to execute instructions based on the captured images or received information. It should be noted that the implementation of the sensor unit 114 as a camera unit in FIG. 1 is merely an example and such an example should not be construed as limiting the disclosure. Examples of the camera unit may include, but not limited to, an image sensor, a wide-angle camera, a camcorder, a digital camera, a night-vision camera, and/or other image capture devices.

The sensor unit 114 may include the first portion 114A and the second portion 114B. The second portion 114B may extend from the first portion 114A in the space 112 that may be formed between the cover 108 and the encapsulation 104. By way of example, and not limitation, the second portion 114B may be removably coupled to the first portion 114A using a fastener to disengage the second portion 114B from the first portion 114A. Thereafter, a repair or replacement of components associated with the sensor unit 114 can be performed.

The support frame 116 may be formed together using the encapsulation 104 and the bezel 106. The support frame 116 may be configured to provide support to the rear quarter glass 102C attached to the quarter glass structure 102B. The support frame 116 may include the opening 116A, which may be configured to receive the first portion 114A of the at least one sensor unit 114. The first portion 114A of the at least one sensor unit 114 may be substantially flushed to the opening 116A.

The lip seal 118 may be disposed between the first portion 114A of the at least one sensor unit 114 and edges of the opening 116A. In an embodiment, the lip seal 118 may form a cushion for the sensor unit 114 so that the sensor unit 114 is not subjected to wear and tear caused due to sudden shock and jerk experienced by the vehicle 102. As an example, the lip seal 118 may seal the first portion 114A of the sensor unit 114 with the edges of the opening 116A such that the sensor unit 114 forms an interference fit with the edges of the opening 116A, via the lip seal 118. In an embodiment, a low friction coating may be coated on the lip seal 118 or the edges of the opening 116A to ease sliding of the sensor unit 114 with the lip seal 118.

The vehicle 102 may include the vehicle body 102A. The vehicle body 102A may include the quarter glass structure 102B. The quarter glass structure 102B attached on one of the C pillar of the vehicle body 102A or between the C pillar and the D pillar of the vehicle body 102A may be referred as the rear quarter glass structure and the quarter glass associated with the rear quarter glass structure may be referred to as the rear quarter glass 102C. The quarter glass structure 102B may include the encapsulation 104 having the cavity 104C configured to receive at least edges of the rear quarter glass 102C of the vehicle 102.

Further, the bezel 106 may be disposed on the first side 104A of the encapsulation 104 to secure the rear quarter glass 102C with the quarter glass structure 102B. The cover 108 may be disposed on the second side 104B of the encapsulation 104 either on the entire periphery or the corner portion of the second side 104B of the encapsulation 104. The cover 108 may be disposed such that the space 112 may be formed between the cover 108 and the encapsulation 104. The space 112 may include the at least one sensor unit 114. The sensor unit 114 may include the first portion 114A and the second portion 114B.

The bezel 106 and the encapsulation 104 together may form the support frame 116 that may include the opening 116A. The opening 116A may be configured to receive the first portion 114A of the at least one sensor unit 114 and the second portion 114B of the sensor unit 114 may extend from the first portion 114A in the space 112 formed between the cover 108 and the encapsulation 104. Moreover, the first side 104A of the sensor unit 114 may form an interference fit with the edges of the opening 116A using the lip seal 118. The sensor unit 114 may be the camera unit that may be configured to receive the images or information from the at least outward of the vehicle 102.

Figure 2:
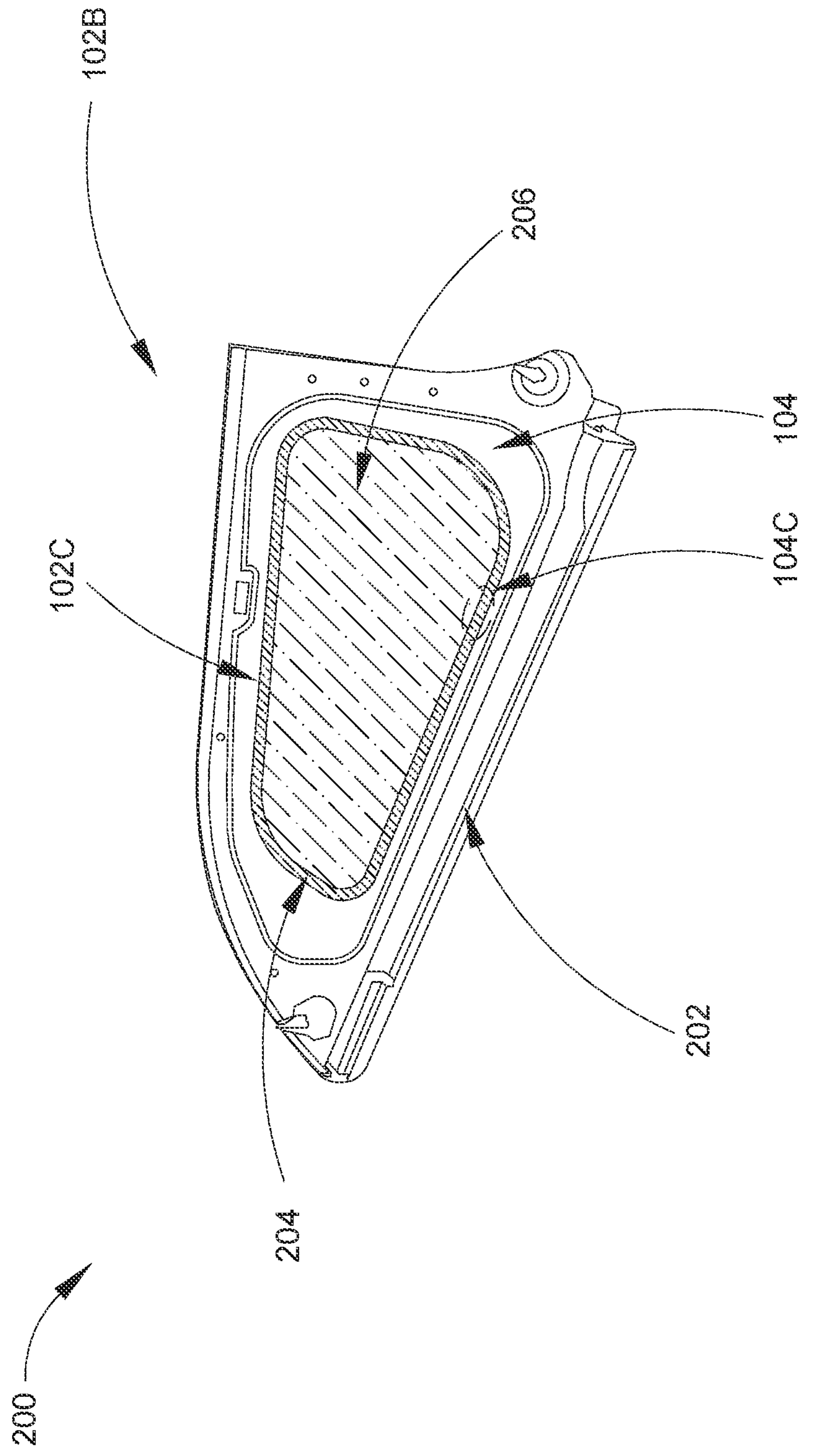
FIG. 2 is a diagram that illustrates sides and surface portions of a rear quarter glass associated with a quarter glass structure, in accordance with an embodiment of the disclosure.

FIG. 2 is a diagram that illustrates sides and surface portions of a rear quarter glass associated with a quarter glass structure, in accordance with an embodiment of the disclosure. FIG. 2 is explained in conjunction with elements from FIG. 1. With reference to the FIG. 2, there is shown a diagram 200 may include at least one side 202, a first surface portion 204, and a second surface portion 206 of the rear quarter glass 102C.

The at least one side 202 of the rear quarter glass 102C may substantially be a cross sectional face of the rear quarter glass 102C that may be in a direct contact with the quarter glass structure 102B. By way of example, and not limitation, the rear quarter glass 102C may have three sides in case the rear quarter glass 102C is disposed between the C pillar and the D pillar of the vehicle body 102A. By way of another example, and not limitation, the rear quarter glass 102C may have four sides in case the rear quarter glass 102C is disposed on the C pillar of the vehicle body 102A. The rear quarter glass 102C may have two sides in case the rear quarter glass 102C is disposed on the C pillar of the vehicle body 102A and has substantially a semicircular shape. Further, the encapsulation 104 may be disposed on the at least one side 202 of the rear quarter glass 102C, as described, for example, in FIG. 1.

The first surface portion 204 of the rear quarter glass 102C may be a portion of the rear quarter glass 102C that may be included inside the cavity 104C of the encapsulation 104. Further details related to the cavity 104C are described in detail, for example, in FIG. 1. It should be noted here that the first surface portion 204 of the rear quarter glass 102C, as shown in FIG. 2, is merely an example and such an example should not be construed as limiting the disclosure.

The second surface portion 206 of the rear quarter glass 102C may extend from the first surface portion 204 of the rear quarter glass 102C. Further, the encapsulation 104 may be disposed on both sides of the second surface portion 206 of the rear quarter glass 102C. By way of example, and not limitation, the second surface portion 206 may be a visible portion of the rear quarter glass 102C. It should be noted here that the second surface portion 206 of the rear quarter glass 102C, as shown in FIG. 2, is merely an example and such an example should not be construed as limiting the disclosure. It should be further noted that the diagram 200 of FIG. 2, is for exemplary purposes and should not be construed to limit the scope of the disclosure.

Figure 3:
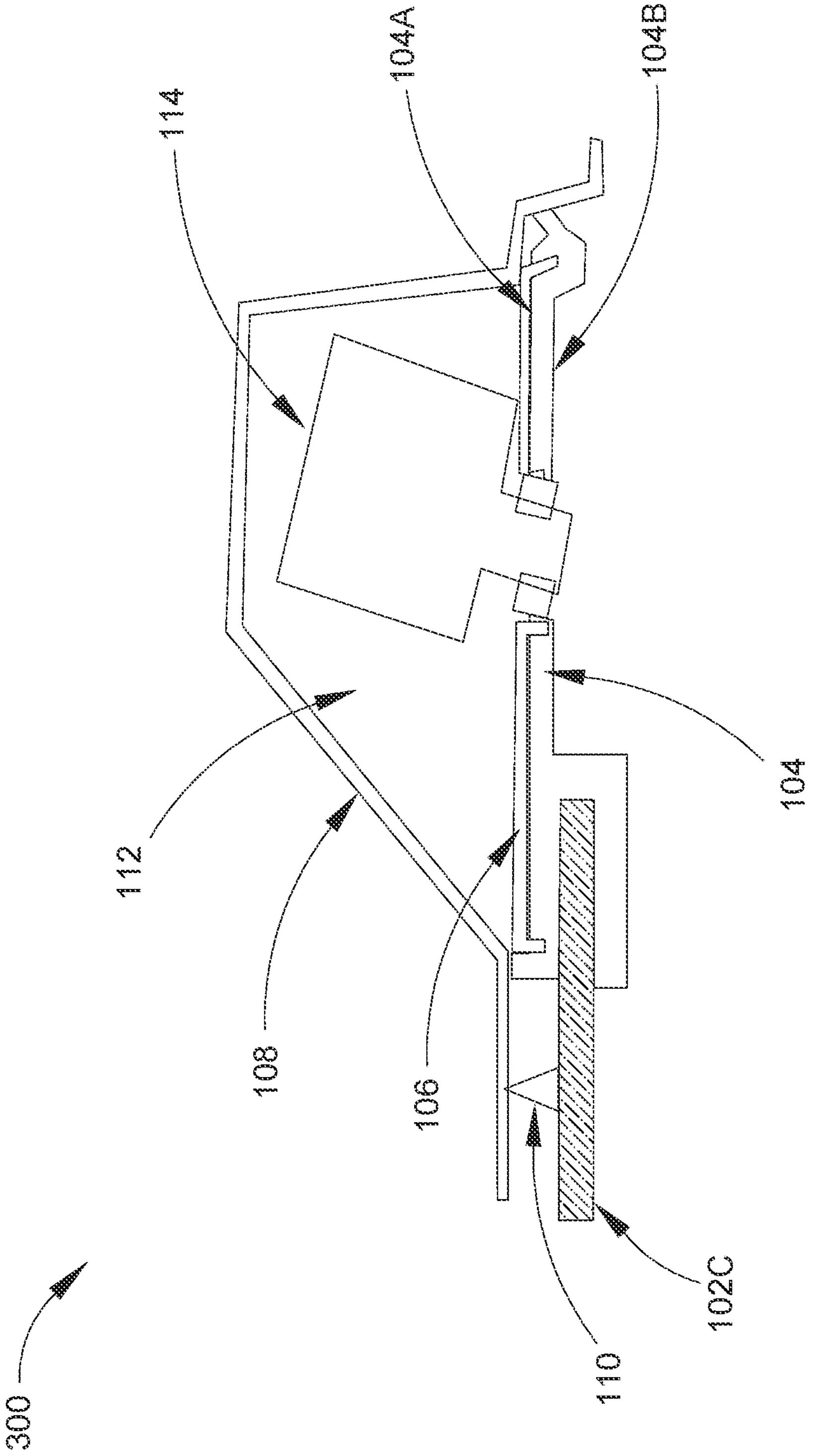
FIG. 3 is a scenario diagram that illustrates disposing a cover on a first side of an encapsulation associated with a quarter glass structure, in accordance with an embodiment of the disclosure.

FIG. 3 is a scenario diagram that illustrates disposing a cover on a first side of an encapsulation associated with a quarter glass structure, in accordance with an embodiment of the disclosure. FIG. 3 is explained in conjunction with elements from FIG. 1 and FIG. 2. With reference to the FIG. 3, there is shown a scenario diagram 300 that illustrates an implementation of disposing the cover 108 on the first side 104A of the encapsulation 104.

In the implementation, the cover 108 may be disposed on the first side 104A of the encapsulation 104. The bezel 106 may be disposed between the first side 104A of the encapsulation 104 and the cover 108. The cover 108 may be disposed such that a space (e.g., the space 112) may be formed between the cover 108 and the bezel 106. The space 112 may include the at least one sensor unit 114. Further, the bezel 106 and the encapsulation 104 may together form the support frame 116 that may include the opening 116A to receive the first portion 114A of the at least one sensor unit 114, as described, for example, in FIG. 1. By way of example, and not limitation, the sensor unit 114 may be configured to receive information or images from at least outward of the vehicle 102.

It should be noted that the scenario diagram 300 of FIG. 3, is for exemplary purposes and should not be construed to limit the scope of the disclosure.

Figure 4:
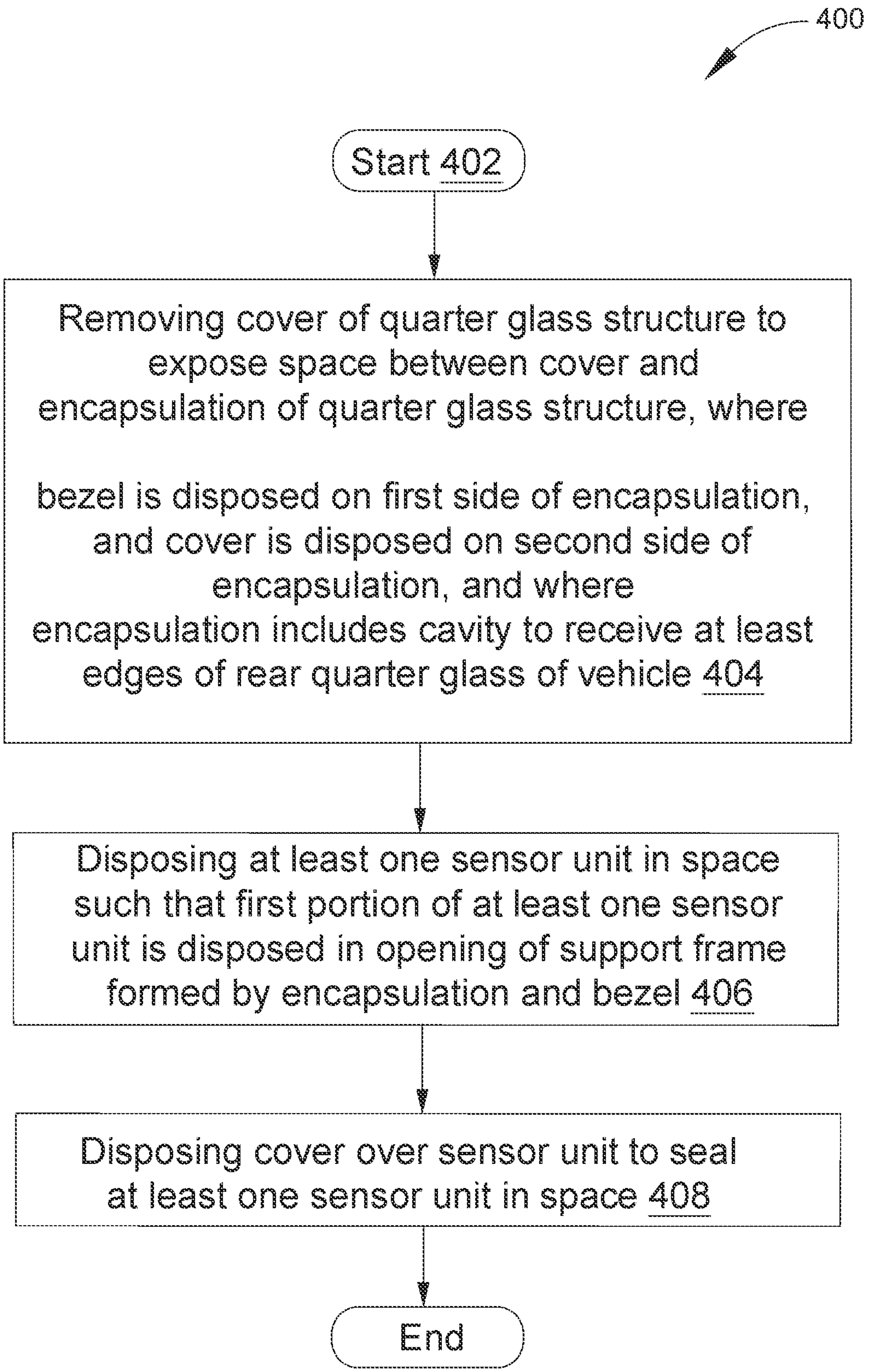
FIG. 4 is a flowchart that illustrates an exemplary method of installation of at least one sensor unit in a vehicle, in accordance with an embodiment of the disclosure.

FIG. 4 is a flowchart that illustrates an exemplary method of installation of at least one sensor unit in a vehicle, in accordance with an embodiment of the disclosure. FIG. 4 is explained in conjunction with elements from FIG. 1, FIG. 2, and FIG. 3. With reference to FIG. 4, there is shown a flowchart 400, which may depict method of installation of the at least one sensor unit 114 in the vehicle 102. The method illustrated in the flowchart 400 may start at 402 and proceed to 404.

At 404, the cover 108 of the quarter glass structure 102B may be removed to expose the space 112 between the cover 108 and the encapsulation 104 of the quarter glass structure 102B. Further, the bezel 106 may be disposed on the first side 104A of the encapsulation 104 and the cover 108 on the second side 104B of the encapsulation 104. Moreover, the encapsulation 104 may include the cavity 104C configured to receive the at least edges of the rear quarter glass 102C. Further details regarding the quarter glass structure 102B, the cover 108, the encapsulation 104, the bezel 106, or the space 112, is described, in detail, for example, in FIG. 1.

At 406, the at least one sensor unit 114 may be disposed in the space 112 such that the first surface portion 204 of the at least one sensor unit 114 is disposed in the opening 116A of the support frame 116 formed by the encapsulation 104 and the bezel 106, is described, in detail, for example, in FIG. 1.

At 408, the cover 108 may be disposed over the sensor unit 114 to seal the at least one sensor unit 114 in the space 112.

Although the flowchart 400 is illustrated as discrete operations, such as 402, 404, 406, and 408, the disclosure is not so limited. Accordingly, in certain embodiments, such discrete operations may be further divided into additional operations, combined into fewer operations, or eliminated, depending on the particular implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also, to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A quarter glass structure, comprising:

an encapsulation that includes a cavity to receive at least edges of a rear quarter glass of a vehicle;

a bezel disposed on a first side of the encapsulation; and a cover disposed on a second side of the encapsulation such that a space formed between the cover and the encapsulation is configured to include at least one sensor unit, wherein the encapsulation and the bezel together form a support frame that includes an opening configured to receive a first portion of the at least one sensor unit, wherein the cover extends over a portion of the rear quarter glass and is separated using a spacer placed between the cover and the rear quarter glass.

2. The quarter glass structure according to claim 1, wherein the rear quarter glass is disposed on one of a C pillar of the vehicle, or between the C pillar and a D pillar of the vehicle.

3. The quarter glass structure according to claim 1, wherein the encapsulation is disposed on at least one side of the rear quarter glass.

4. The quarter glass structure according to claim 1, wherein the rear quarter glass includes a first portion and a second portion that extends from the first portion, and wherein the encapsulation is disposed on both sides of the rear quarter glass in the second portion.

5. The quarter glass structure according to claim 1, wherein the at least one sensor unit is a camera unit.

6. The quarter glass structure according to claim 1, wherein the at least one sensor unit comprises:

the first portion that is substantially flushed to the opening; and a second portion that extends from the first portion in the space formed between the cover and the encapsulation.

7. The quarter glass structure according to claim 1, wherein the cover is disposed on one of an entire periphery of the second side of the encapsulation, or a corner portion of the second side of the encapsulation.

8. The quarter glass structure according to claim 1, wherein the cover is disposed on the first side of the encapsulation and the bezel is disposed between the first side of the encapsulation and the cover.

9. The quarter glass structure according to claim 1, further comprises a lip seal disposed between the first portion of the at least one sensor unit and edges of the opening, wherein the first portion of the at least one sensor unit forms an interference fit with the opening using the lip seal.

10. A vehicle body, comprising:

a quarter glass structure that includes:

an encapsulation that includes a cavity to receive at least edges of a rear quarter glass of a vehicle;

a bezel disposed on a first side of the encapsulation; and a cover disposed on a second side of the encapsulation such that a space formed between the cover and the encapsulation is configured to include at least one sensor unit, wherein the encapsulation and the bezel together form a support frame that includes an opening configured to receive a portion of the at least one sensor unit, the vehicle body further comprising a lip seal disposed between a first portion of the at least one sensor unit and edges of the opening, wherein the first portion of the at least one sensor unit forms an interference fit with the opening using the lip seal.

11. The vehicle body according to claim 10, wherein the at least one sensor unit comprises:

a first portion that is substantially flushed to the opening; and a second portion that extends from the first portion in the space formed between the cover and the encapsulation.

12. The vehicle body according to claim 10, wherein the cover is disposed on one of an entire periphery of the second side of the encapsulation, or a corner portion of the second side of the encapsulation.

13. The vehicle body according to claim 10, wherein the cover extends over a portion of the rear quarter glass and is separated using a spacer placed between the cover and the rear quarter glass.

14. A method of installation of at least one sensor unit in a vehicle, the method comprising:

removing a cover of a quarter glass structure to expose a space between the cover and an encapsulation of the quarter glass structure, wherein a bezel is disposed on a first side of the encapsulation, the cover is disposed on a second side of the encapsulation, and the encapsulation includes a cavity to receive at least edges of a rear quarter glass of the vehicle;

disposing the at least one sensor unit in the space such that a first portion of the at least one sensor unit is disposed in an opening of a support frame formed by the encapsulation and the bezel; and disposing the cover over the sensor unit to seal the at least one sensor unit in the space, wherein the cover extends over a portion of the rear quarter glass and separated using a spacer placed between the cover and the rear quarter glass.

15. The method according to claim 14, wherein the at least one sensor unit comprises:

the first portion that is substantially flushed to the opening; and a second portion that extends from the first portion in the space formed between the cover and the encapsulation.

16. The method according to claim 14, wherein the cover is disposed on one of an entire periphery of the second side of the encapsulation, or a corner portion of the second side of the encapsulation.

17. The method according to claim 14, further comprising disposing a lip seal between the first portion of the at least one sensor unit and edges of the opening, wherein the first portion of the at least one sensor unit forms an interference fit with the opening, using the lip seal.

* * * * *